(12) United States Patent
Donahue

(10) Patent No.: US 8,511,884 B2
(45) Date of Patent: Aug. 20, 2013

(54) ONE-WAY SEE-THROUGH ILLUMINATION SYSTEM

(76) Inventor: Kevin G. Donahue, Harvard, MA (US)

( * ) Notice: Subject to any disclaimer, the term of this patent is extended or adjusted under 35 U.S.C. 154(b) by 112 days.

(21) Appl. No.: 13/136,799

(22) Filed: Aug. 10, 2011

(65) Prior Publication Data

US 2012/0134172 A1 May 31, 2012

Related U.S. Application Data

(63) Continuation-in-part of application No. 12/419,284, filed on Apr. 6, 2009, now Pat. No. 8,100,575, which is a continuation-in-part of application No. 11/336,263, filed on Jan. 20, 2006, now Pat. No. 7,513,674.

(51) Int. Cl.
*F21V 7/04* (2006.01)

(52) U.S. Cl.
USPC ............ 362/627; 362/618; 362/607; 362/103

(58) Field of Classification Search
USPC ................ 362/627, 606, 607, 618, 624, 103
See application file for complete search history.

(56) References Cited

U.S. PATENT DOCUMENTS

2008/0285307 A1* 11/2008 Aylward et al. ............... 362/618

* cited by examiner

*Primary Examiner* — David V Bruce
(74) *Attorney, Agent, or Firm* — Kriegsman & Kriegsman

(57) ABSTRACT

A one-way see-through illumination system is constructed from a light guide panel, a front-illumination image film, and a light injector. The light injector injects light into the light guide panel at a suitable angle for total internal reflection of the injected light at the surfaces of the light guide panel. The image film includes a half-toned front-illuminable image pattern that extracts light from the light guide panel. When active, light from the light guide panel front illuminates the image pattern for viewing by a front-side view, while a backside viewer can see through the image pattern.

14 Claims, 19 Drawing Sheets

ONE-WAY SEE-THROUGH ILLUMINATION SYSTEM

CROSS-REFERENCE TO RELATED APPLICATIONS

The present application is a continuation-in-part of U.S. patent application Ser. No. 12/419,284, inventor Kevin G. Donahue, filed Apr. 6, 2009, now U.S. Pat. No. 8,100,575 which, in turn, is a continuation-in-part of U.S. patent application Ser. No. 11/336,263, inventor Kevin Gerard Donahue, filed Jan. 20, 2006, now U.S. Pat. No. 7,513,674, the disclosures of both of which are incorporated herein by reference.

BACKGROUND OF THE INVENTION

The present invention relates generally to light guides that emit light and relates more particularly to one-way see-through light-emitting light guides.

Various applications of light guides are known in the art. A light guide operates on the principle of total internal reflection at the surface interface between the light guide material and the ambient medium. Light can be extracted from the light guide by altering the interface, such as by replacing the ambient medium with another material to frustrate the total internal reflection at that interface. Light guides have been useful for the transmission of optical information and for backlights.

For example, an illuminated image can be created by using a marker to deposit an illuminable ink on an active light guide. When ink, containing a light diffusing agent, is applied to the surface of this device, total internal reflection is "frustrated," allowing light to be extracted into the ink, which then diffuses this light to produce an illuminated image. This effect can easily be produced by writing on an edge-illuminated light guide with a white crayon.

See-through graphic art images are also known in the art. One technique is now commonly used in advertisements, including printed graphics employed on automobile windows. In such see-through displays, a graphic image is printed on a perforated film or "perf-film." These perforations allow a viewer of the back surface of the film to see-through the graphic image without seeing the graphic art displayed on the front surface of the film.

SUMMARY OF THE INVENTION

A one-way see-through display system in accordance with an embodiment of the invention is mountable to a sheet of optical material having a front surface and a back surface. The sheet of optical material has a predetermined critical angle of incidence at the front surface and the back surface sufficient to establish total internal reflection of light at the front surface and the back surface when interfaced with an expected ambient environment. The sheet of optical material can have a curved surface, such as a lens. In particular, the display system includes a light source and an image film.

The light source can be coupled to the sheet of optical material for injecting light into the sheet of optical material. The light is injected at an angle of incidence at the front surface and the back surface that is greater than the respective predetermined critical angle of incidence to promote total internal reflection of the injected light within the sheet of optical material. In particular, the light injector can generate multi-colored light. The light injector can be powered by a solar cell, AC power, or DC batteries.

The image film includes a front surface and a back surface. The front surface includes an image pattern comprising a top layer and a bottom layer. The bottom layer of the image pattern can be a light reflecting material and the top layer of the image pattern can be an illuminable material. The illuminable material can be bondable to the back surface of the sheet of optical material, where the bonded top layer of the image pattern extracts injected light from the back surface of the sheet of optical material to illuminate the image pattern for viewing through the front surface of the sheet of optical material. In particular, a colorant can be added to the image pattern, such as by dye-coating the reflective material.

In particular, the image film can comprise an illuminable adhesive that can bond the image film to the optical material at a plurality of bonding points. Furthermore, the illuminable adhesive can include a light diffusing material. The illuminable adhesive can have an index refraction greater than or equal to the index of refraction of the optical material.

The system can further include an image blocking image pattern layer disposed in the image film. The image-blocking image pattern layer can be a clear material or a printable varnish, for example.

Furthermore, the system can include a photovoltaic material disposed on the back surface of the film. The photovoltaic material can be patterned to register with the image pattern.

In accordance with another embodiment of the invention, a one-way see-through illumination film has a front side and a back side. The particular illumination film can include a bottom layer of a transparent film; an intermediate layer of light-reflecting material disposed on the front side of the transparent film, where the light-reflecting material can be arranged to form an image pattern; and a top layer of illuminable adhesive, where the illuminable adhesive can be registered to the light-reflecting material.

More particularly, the image pattern can be a halftone image pattern. In addition, a photovoltaic layer can be disposed on the back side of the bottom layer to collect light energy.

In accordance with another embodiment of the invention, a one-way see-through illumination device can include a frame structure, a sheet of optical material mounted to the frame structure, a light source mounted to the frame structure, and an image film.

The sheet of optical material has a front surface and a back surface. The sheet of optical material can have a predetermined critical angle of incidence at the front surface and the back surface sufficient to establish total internal reflection of light incident at the front surface and the back surface when interfaced with an expected ambient environment.

The light source can be optically coupled to the sheet of optical material for injecting light into the sheet of optical material at an angle of incidence at the front surface and the back surface that is greater than the predetermined critical angle of incidence to promote total internal reflection of the injected light within the sheet of optical material.

The image film includes a front surface and a back surface. The front surface includes an image pattern comprising a top layer and a bottom layer. The bottom layer of the image pattern can be a light-reflecting material and the top layer of the image pattern can be an illuminable material. The illuminable material can be bondable to the back surface of the sheet of optical material, where the bonded top layer of the image pattern extracts injected light from the back surface of the sheet of optical material to illuminate the image pattern for viewing through the front surface of the sheet of optical material. In particular, a colorant can be added to the image pattern, such as by dye-coating the reflective material.

In a more particular embodiment, the frame structure can be securable to the head of a person. The frame structure can include a light guide for optically coupling the light source to the sheet of optical material. In addition, the sheet of optical material can be a lens or a plurality of lenses. Furthermore, the half-tone image pattern can be at least 20% filled at a resolution of at least 100 lines per inch.

In still another embodiment, the one-way see-through illumination device can be personal headwear, such as novelty eyeglasses, comprising (a) a light guide, the light guide having a front surface and a back surface, there being a predetermined critical angle of incidence at the front surface and the back surface sufficient to establish total internal reflection of light incident at the front surface and the back surface when interfaced with an expected ambient medium; (b) a light source optically coupled to the light guide for injecting light into the light guide at an angle of incidence relative to the front surface and the back surface that is greater than the predetermined critical angle of incidence to promote total internal reflection of the injected light within the light guide; (c) an image pattern comprising a back layer and a front layer, the back layer of the image pattern being a light reflecting material and the front layer of the image pattern being an illuminable material, wherein the illuminable material is bonded to the back surface of the light guide and extracts the injected light from the back surface of the sheet of optical material to illuminate the image pattern for viewing through the front surface of the light guide, wherein the light emitted from the illuminable material is substantially monochromatic; and (d) a color filter positioned behind the illuminable material for selectively absorbing the substantially monochromatic light emitted from the illuminable material that is back-reflected off the front surface of the light guide, the color filter allowing other wavelengths of light to be transmitted therethrough.

The color filter may be a complementary color filter of the back-reflected light that was previously emitted from the illuminable material, the color filter absorbing the back-reflected light while letting other wavelengths of light pass therethrough. For example, if the back-reflected light previously emitted from the illuminable material is green, the color filter may be red. If the light is orange, the color filter may be blue. If the light is yellow, the color filter may be violet. If the light is red, the color filter may be green. If the light is violet, the color filter may be yellow. If the light is blue, the color filter may be orange. In this manner, the color filter effectively eliminates the back-reflected light emitted from the illuminable material from reaching the wearer $V_2$ but still permits the wearer $V_2$ to see most other wavelengths of light.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. The drawings are not necessarily to scale, emphasis instead being placed upon illustrating the principles of the invention. In the drawings wherein like reference numerals represent like parts.

DETAILED DESCRIPTION OF PREFERRED EMBODIMENTS

Figure 1:
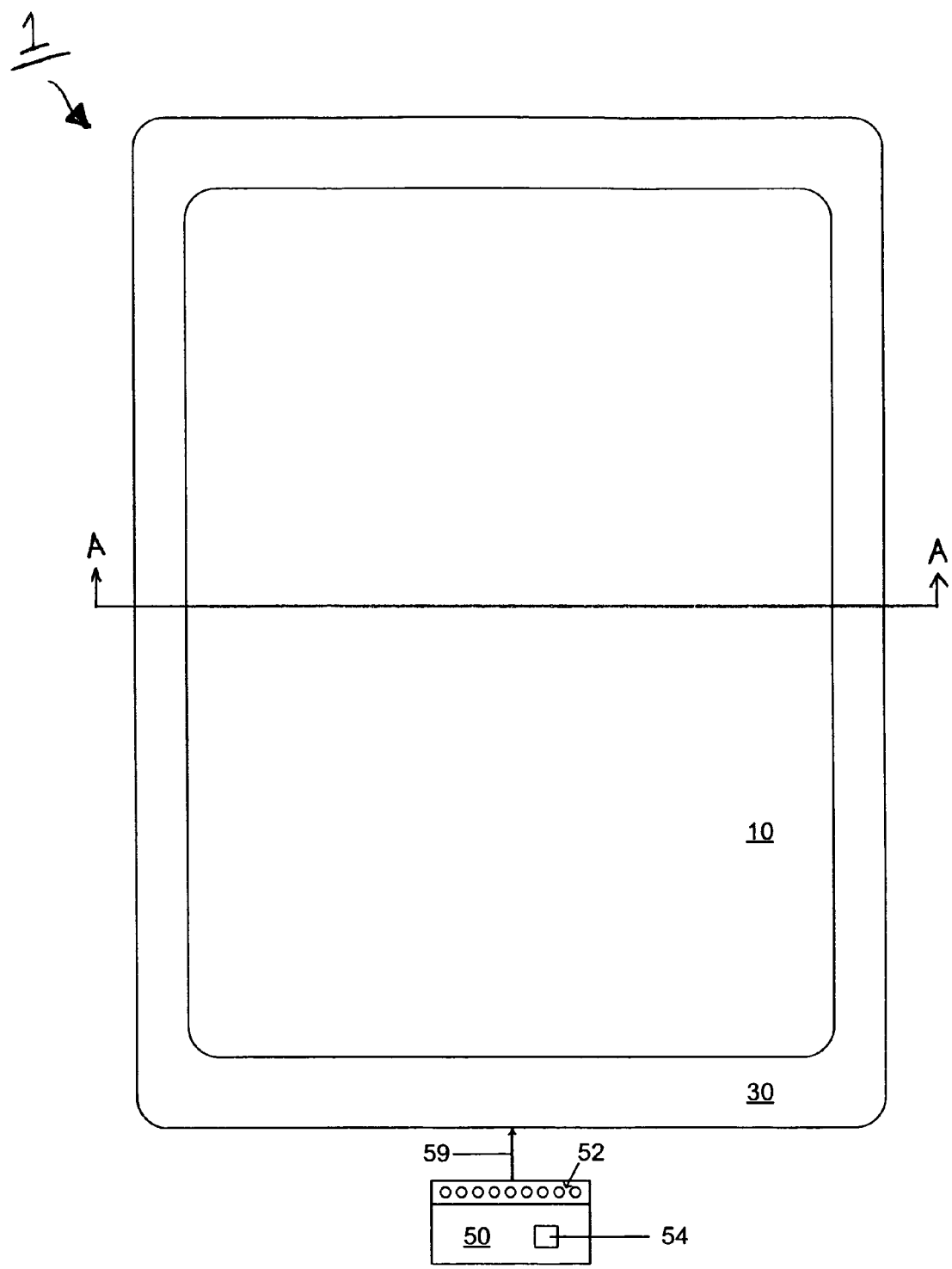
FIG. 1 is a schematic of a particular one-way see-through illumination device.

The invention will now be described in terms of a limited number of particular embodiments, which are illustrated in the drawings.

FIG. 1 is a schematic of a particular one-way see-through illumination system. The core components of the one-way see-through illumination system 1 are an active light guide 30, i.e., a transparent material containing injected light, and an illuminable halftone image backed by a reflective material. As shown, the system 1 includes an illuminable image decal/ film 10 that is bonded to a light guide panel 30. A light injector 50 is also shown optically coupled to the light guide panel 30, such as through a light guide 59.

The light guide panel 30, i.e., transparent material component of the illumination system, can be fabricated by cutting clear plastic sheets, such as polycarbonate ("Lexan") or acrylic sheets. Light guides can also be manufactured via thermoforming and injection molding. The light guide panel can also be a user-supplied item, such as a window or transparent billboard panel.

The one-way see-through image decal 10 is used to present an image pattern (not shown) to a viewer located on the opposite side of the light guide panel 30. Light injected into the light guide panel 30 by the light injector 50 is extracted from the light guide panel 30 by materials in the decal 10 to illuminate the image pattern. The light guide panel 30 can include any suitable optically clear material formed into a curved or planar panel, including glass, polycarbonate, and acrylic. The illuminable image can include text and graphic images. Example images are messages, commercial displays, and themed displays (e.g., patriotic, religious, holiday, celebratory). Those of ordinary skill in the art will understand that there are other applications for the illuminable display system.

The light injector 50 acts as an edge-illuminating light source by injecting light into the light guide panel 30. In a particular embodiment, the light injector 50 includes an LED array 52. A light source controller 54 can be used to control the illumination level within the light guide panel 30. If a multi-color light source is present, the light source controller 54 can also include a switch for controlling the color of light being injected into the light guide panel 30 including, for example, adjusting the illumination level for an RGB LED array. The light injector can be AC powered, DC battery powered, or solar powered via a solar panel (not shown).

The light injector 50 can be bonded to the light guide panel with an optically clear adhesive. The light injector 50 can also be insert-molded directly into the light guide panel 30 or, and although less optimal (less efficient light capture by the light guide panel 30), the light injector 50 can also be simply mounted directly to the edge of the light guide panel 30. Further, a light injector 50 that emits light at the proper angle can also be used to inject light into the light guide panel 30 through a surface of the light guide panel 30, for example, the interior surface of a window.

Figure 2:
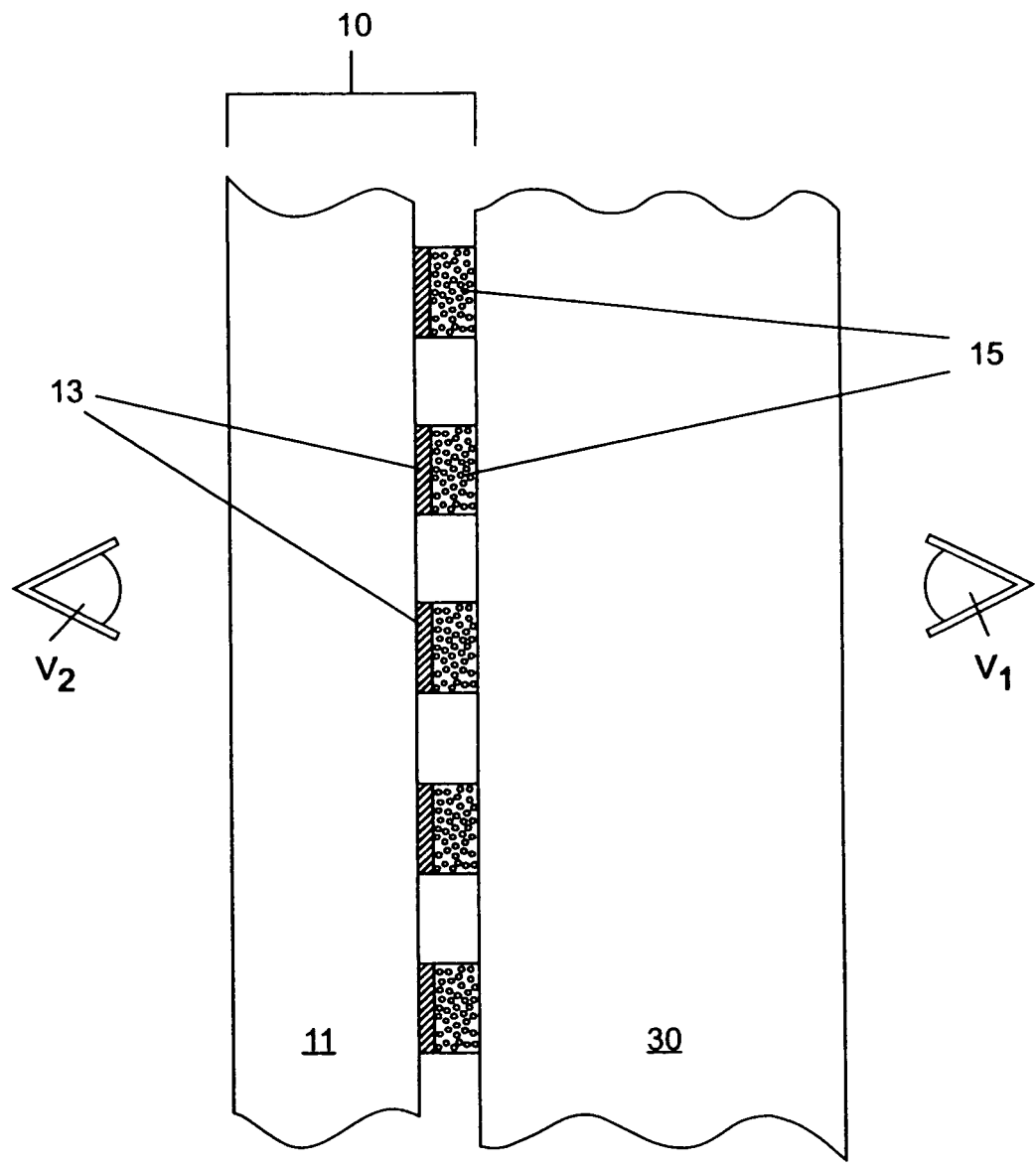
FIG. 2 is a foreshortened cross-sectional view of the one-way see-through illumination device taken along line A-A of FIG. 1.

FIG. 2 is a foreshortened cross-sectional view of the one-way see-through illumination device taken along line A-A of FIG. 1. As shown, the device 1 can be viewed by viewers $V_1$, $V_2$ located on opposite sides of the device 1. For convenience, the side faced by the first viewer $V_1$ is defined as the front side of the device while the side faced by the second viewer $V_2$ is defined as the back side of the device.

In this view, the decal 10 can be seen as having multiple layers. An optically clear backing layer 11 provides the structural support for the decal 10. On the front surface of the backing layer 11 are a plurality of pixel reflectors 13 which define the image pattern. In particular, the pixel reflectors 13 are arranged in a half-tone pattern. A layer of adhesive 15 is shown deposited on the front surface of the pixel reflectors 13 to bond the decal 10 to the light guide panel 30. The adhesive bond between the adhesive layer 15 and the light guide panel 30 can be permanent or repositionable. A repositionable adhesive enables the one-way see-through image decal to be removed or removed and re-adhered. In particular, the adhesive is a light diffusing or illuminable adhesive.

Figure 3:
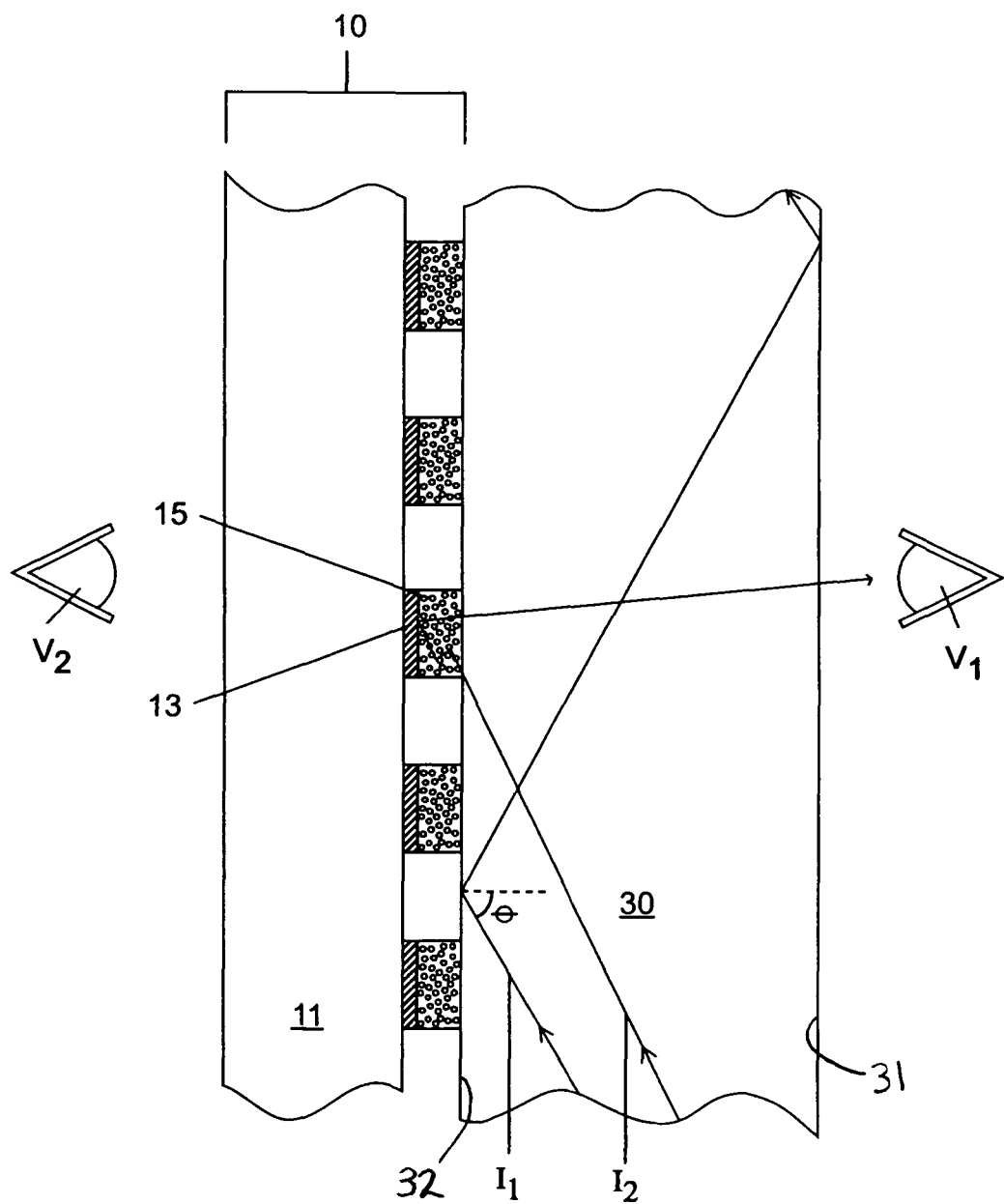
FIG. 3 is a diagram of the cross-sectional device of FIG. 2 showing the operation of the device on injected light rays.

FIG. 3 is a diagram of the cross-sectioned device of FIG. 2 showing the operation of the device on injected light rays. The injected light rays $I_1$, $I_2$ are generated by the light injector 50 and injected at a specific angle of incidence $\Phi$ sufficient to yield total internal reflection between the surfaces 31, 32 of the light guide panel 30. The critical angle of incidence necessary to result in total internal reflection is calculated from the index of refraction of the light guide material and the index of refraction of the adjacent medium. In the case of a glass panel and an air medium, the critical angle is about 43°. As shown, an injected light ray $I_1$ that impacts a surface of the light guide panel 30 bounded by air at an angle of incidence greater than the critical angle of 43° will experience total internal reflection toward the opposite surface of the light guide panel 30.

In comparison, an injected light ray $I_2$ that impacts the back surface 32 of the light guide panel 30 where bounded by the adhesive 15 does not undergo total internal reflection. In particular, the index of refraction of the adhesive 15 is chosen to be equal to or greater than the index of refraction of the light guide material 30. More particularly, the adhesive 15 has a refractive index of about 1.6 whereas typical materials for the light guide 30 (glass, acrylic, polycarbonate) have refractive indices of about 1.5.

As shown, that light ray $I_2$ will be transmitted into the adhesive 15 where it will be diffused and impact the pixel reflector 13 at an angle and reflect the light ray $I_2$ back through the adhesive 15, where it will be further diffused. The reflected and diffused light ray $I_2$ will exit the adhesive 15 and be transmitted into the light guide panel at an arbitrary angle. If the light ray $I_2$ impacts the front surface 31 of the light guide 30 at an angle less than the critical angle of refraction, then light will escape the light guide and be visible to the front side viewer $V_1$.

Figure 4:
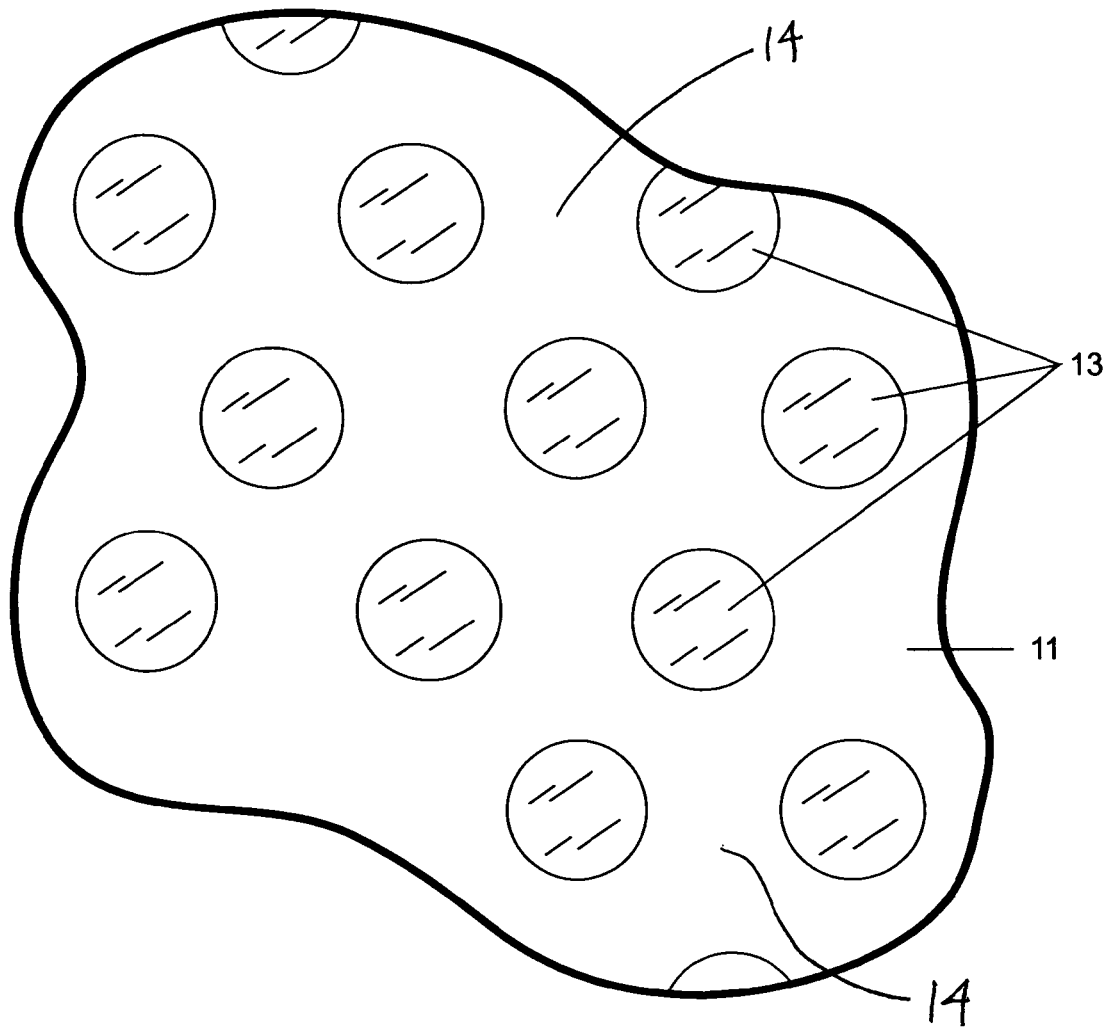
FIG. 4 is a front-side view of a section of an image pattern.

FIG. 4 is a front-side view of a section of an image pattern. As shown, the reflective pixels 13 defining the image pattern are half-toned. In other words, an area 11 of the image pattern is only partially filled by pixels 13, the remainder of the area 11 being voids 14. The ratio of reflective pixels 13 to voids 14 depends on the resolution of the image. It has been found that a low resolution image of approximately fifty lines per inch, composed of a thirty percent halftone (a 70% transparent image), is an effective image pattern for a decorative one-way see-through illumination device 10. As shown, the image pattern is formed from a 30% halftone of circular shaped pixels.

A one-way see-through device can be rendered by printing a halftone image composed of an illuminable adhesive directly onto a light guide. The adhesive is then coated with a reflective material such as aluminum powder or thin film. It was found, however, that the powder method did not provide adequate light reflection and the application of a thin film, commonly referred to as cold or hot stamping, could not produce the resolution required for a quality one-way see-through illuminated image. Improved methods of producing a one-way see-through image system are described below.

Figure 5:
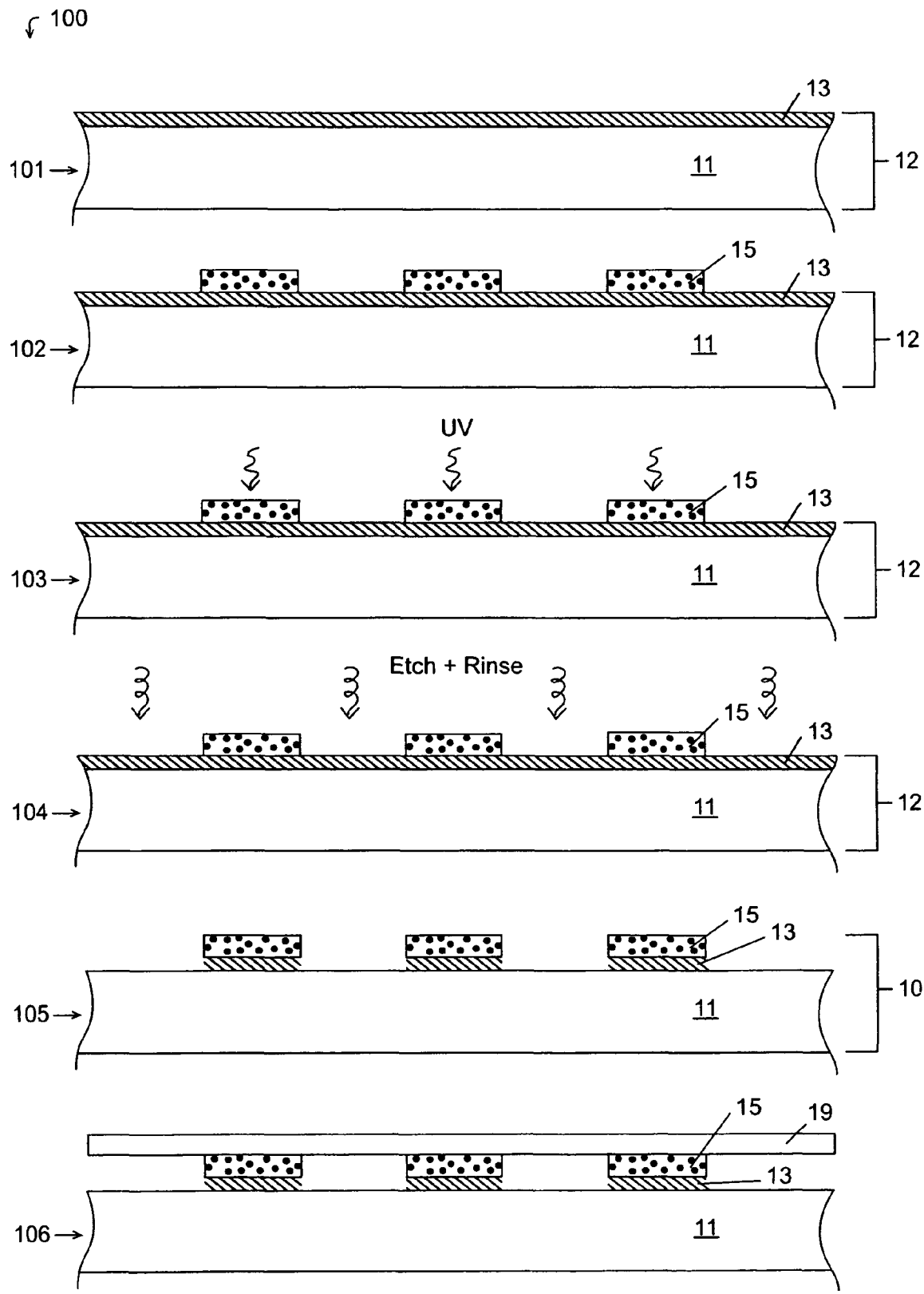
FIG. 5 is a process flow diagram of a particular method of manufacturing a one-way see-through image decal of FIG. 1.

FIG. 5 is a process flow diagram of a particular method of manufacturing the decal 10 of FIG. 1. The process 100 starts at step 101, where a thin (i.e., 0.0005-0.002 inch) reflective polyester film 12, such as Mylar film having a metalized layer 13 over a clear film 11, is placed into position for processing with the metalized layer 13 facing up. The reflective film 12 is coated with a sufficient layer of aluminum to reflect about 99% of the incident light rays, with a reflectivity level corresponding to a reflection coefficient greater than 2.0. This reflectivity level is commonly produced by manufactures of reflective films. The reflective film 12 can be dye-coated at the desired pixel locations to yield a color image pattern.

At step 102, illuminable adhesive 15 is deposited over the metalized layer 13. The particular illuminable adhesive includes a screen-printable permanent UV curable adhesive, commercially available from KIWO of Seebrook, Tex. under part number SHVH3366VP. The adhesive 15 resists etching by the corrosive aluminum etching solutions used to remove the aluminum from the film web (described below). The adhesive 15 is made light diffusing by incoroporating a light diffusing agent, such as titanium dioxide. An adhesive formulation containing twenty percent by weight titanium dioxide was found to be sufficient to produce illumination. The illuminable adhesive 15 is deposited at specific locations to define a half-tone image pattern.

The adhesive 15 is deposited by a screen printing technique using a 330-400 mesh high-tension (over 25 Newtons) screen. A particularly suitable screen is custom-made and commercially available from DEK of Weymouth, England. DEK screens are capable of printing a high-resolution (120 lines per inch) halftone image composed of a 0.0007-0.001 inch layer of illuminable adhesive. This relatively thick adhesive layer, when compared to printing ink, is suitable to produce adequate bonding of the illuminable image pattern to the light guide panel 30. The image resolution produced by the particular screen is sufficient to enable the production of a variety of one-way see-through devices, including window decorations and novelty glasses. Furthermore, the modified rotary screen printing equipment used to produce one-way see-through illumination film is capable of producing film at speeds greater than 150 feet per minute. This equipment makes it possible to produce a significant volume of film at a low-cost.

At step 103, the adhesive 15 is cured under UV light.

At step 104, a corrosive etchant is introduced to etch the metalized layer 13 that is not covered by the adhesive 15. Effective etching solutions included a sodium hydroxide solution and a phosphoric acid based etchant sold under the name Transene. Ultimately, it was determined that a water solution containing 50% sodium hydroxide was a particularly suitable etchant for generating a high resolution light-reflecting image pattern. A particular etchant for this process is a warm solution (150° F.) of 50% sodium hydroxide and 50% water.

A fountain roller containing the warm sodium hydroxide and water solution is used to apply etchant to a surface of the film. This etchant removes the unwanted aluminum in under a tenth of a second. After etching, the film is then neutralized in a hydrochloric acid solution that is maintained at a pH of 2. After neutralization, two or more water rinses are deployed to stabilize the film.

An alternative method to the use of a chemical etchant to produce a one-way see-through illumination film includes the use of a YAG laser. A YAG laser produces coherent light with a wave length of 1064 nm in the infrared. This laser wavelength ablates aluminum but has no effect on optical plastics such as acrylic, polyester or polycarbonate. Accordingly, using a YAG laser, aluminum can be removed from the surface of a metalized film without scarring the underlying plastic. To produce this film, an imaging system, such as a Cognex imaging system, must be integrated with a YAG laser, such as an Epilog Laser, to ensure the laser beam only etches the unwanted metal and not the halftone pattern. Using a laser, it is possible to produce a decal film that has a halftone pattern with a resolution greater than 120 lines per inch. However, several minutes are currently needed to manufacture a square inch of see-through film using a YAG laser. This limits the mass production potential of the YAG-based production method at this time.

Turning to step 105, after the film is stabilized, the reflective pixels 13 covered by the illuminable adhesive 15 remain intact. The etching process results in the metal being removed from the area of the transparent film that was not protected by the illuminable adhesive 15. The result is a one-way see-through illuminable film 10.

Lastly, at step 106, a protective release material 19, such as coated paper, is deposited over the structure to protect the decal until use.

As an alternative, the adhesive 15 first can be printed onto the surface of a transfer substrate as the illuminable image pattern. This transfer substrate includes a release layer having a very low surface energy to deter adhesion. In particular, a chemical resistant pressure sensitive adhesive is printed on a low-surface energy film, such as a silicon release liner or a Teflon coated film. A rotary screen press, such as a Stork Rotary Screen press, that has the ability to heat and then print hot melt adhesives can be used to apply the illuminable image pattern. The illuminable image pattern is then transferred to the metalized layer 13 and then separated from the transfer substrate.

The method of printing an illuminable image pattern on a transfer film enables printing companies that lack the equipment to print an illuminable image pattern from an illuminable adhesive to create a one-way see-through illuminable film by applying the illuminable image pattern to a dye-colored image printed on a metalized film.

Figure 6:
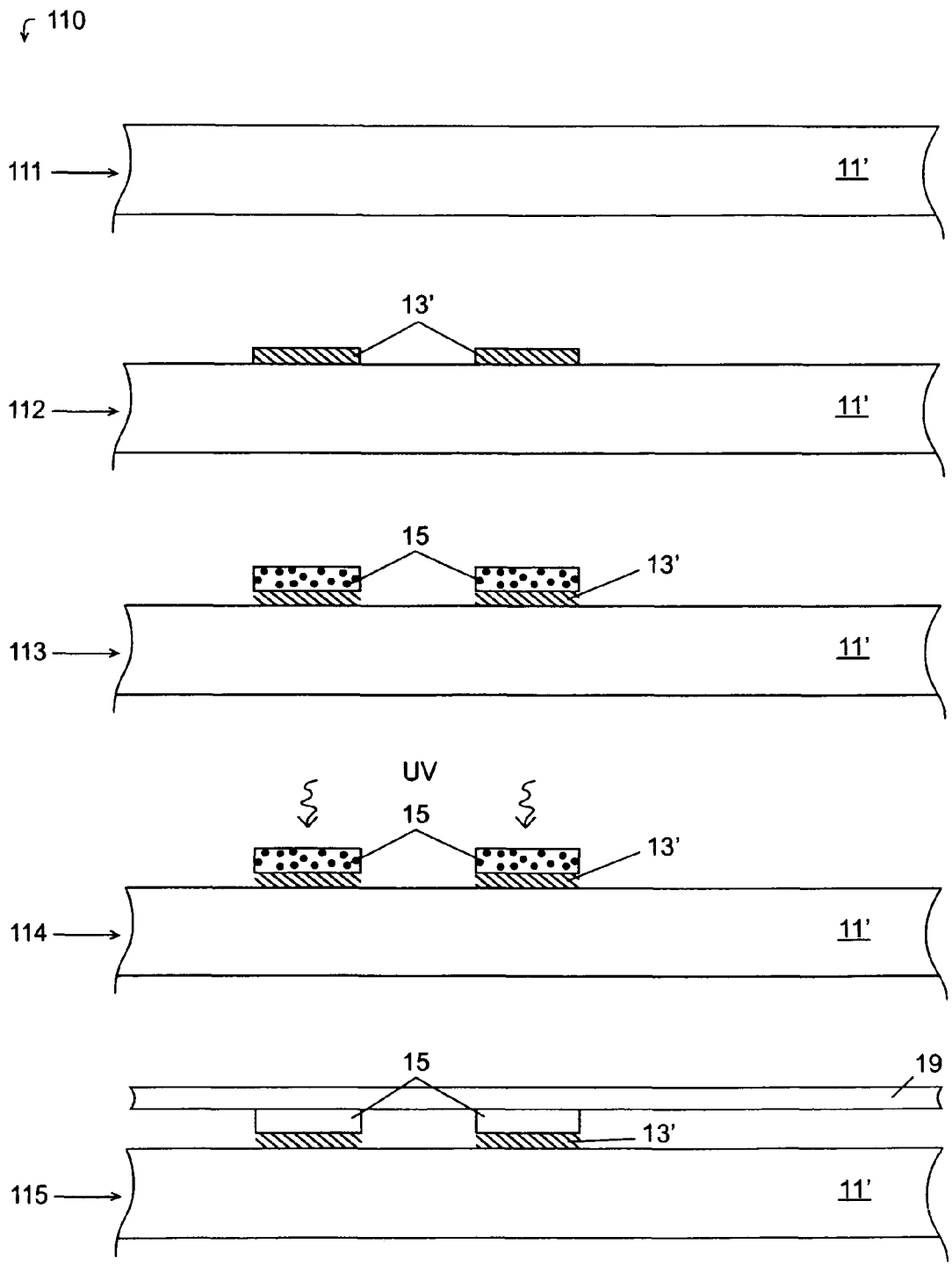
FIG. 6 is a process flow diagram of another particular method of manufacturing a one-way see-through image decal of FIG. 1.

FIG. 6 is a process flow diagram of another particular method of manufacturing a one-way see-through image decal 10 of FIG. 1. The process 110 starts at step 111, where an optically clear film substrate is placed in position. In a particular embodiment, the film substrate is a polyester film 11'.

At step 112, light reflecting material 13' is deposited onto the front surface of the film 11'. The light reflecting material deposits 13' are made at specific locations to define a half-tone image pattern. In a particular embodiment, the light reflecting material is aluminum deposited on the film substrate by vacuum deposition. The reflective material can then be colorized with dyes to permit the creation of color image patterns.

At step 113, an illuminable adhesive 15 is deposited over each light reflecting material deposit 13'. The illuminable adhesive 15 includes a light diffusing agent, such as titanium dioxide, to promote the light refraction necessary to produce visible illumination. Further, the illuminable adhesive 15 is optimized for bonding to the light reflecting image pattern to the transparent material of the intended light guide panel 30. In the particular embodiment, the transparent material of the light guide is an optical plastic, such as acrylic or polycarbonate, and the adhesive is a pressure-sensitive acrylic adhesive.

At step 114, the adhesive 15 is cured, such as by applying UV light.

Lastly, at step 115, a protective release material 19 is deposited over the structure to protect the decal until use.

Figure 7:
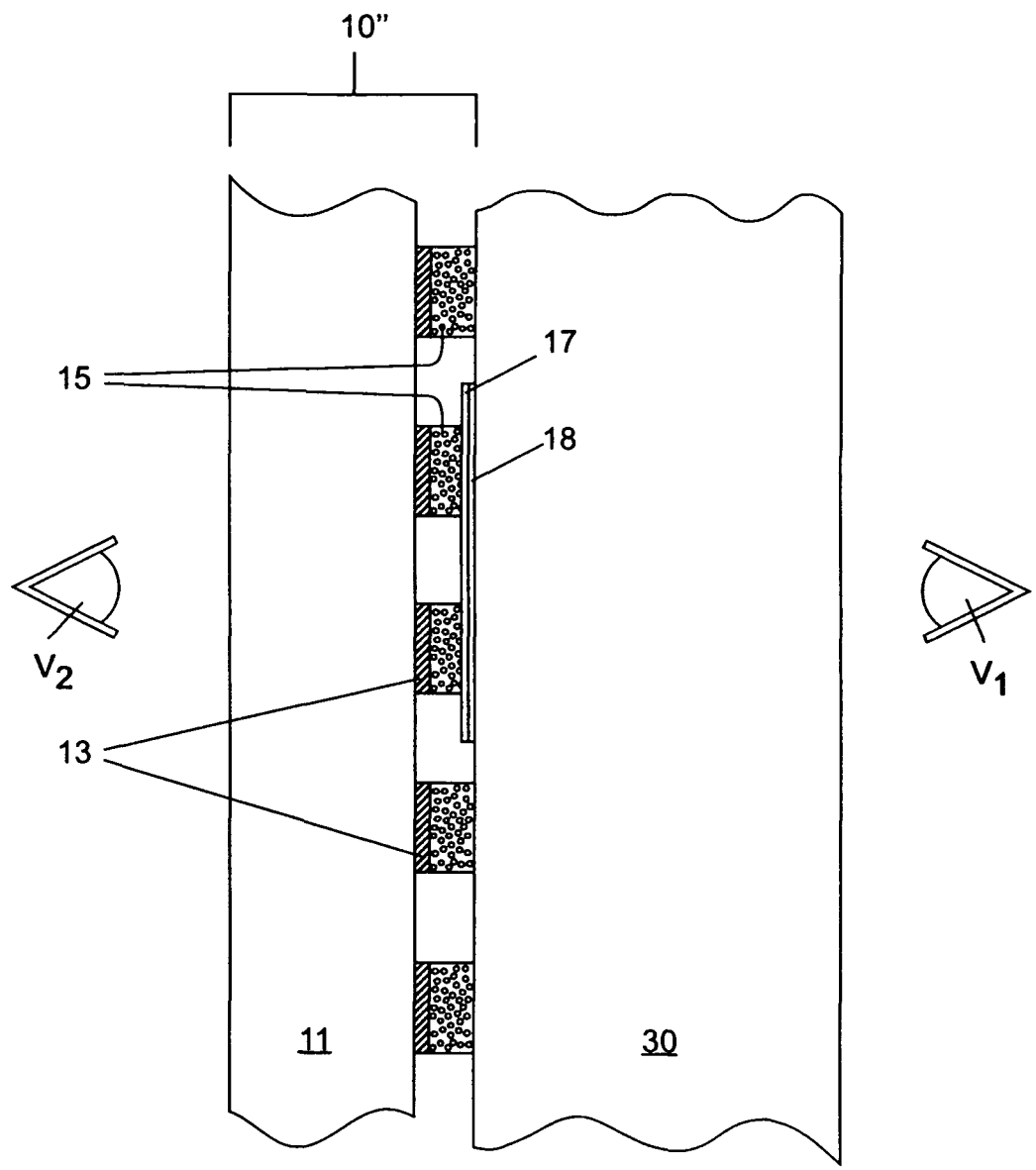
FIG. 7 is a foreshortened cross-sectional view of another embodiment of the one-way see-through illumination device taken through line A-A of FIG. 1.

FIG. 7 is a foreshortened cross-sectional view of another embodiment of a particular one-way see-through illumination device taken through line A-A of FIG. 1. The structure and operation is similar to the above-described device, except that the illuminable image decal/film 10" includes a blocking layer 17 separated from the light guide panel 30 by an air gap 18. An effective blocking material is a clear ink, a clear, non-stick, varnish, or a thin die-cut clear film, such as a 0.0005 inch polyester film. In particular, this structure enables the presence of a uniform image pattern on the back surface of the one-way see-through illumination device, i.e. there is no image formed on the back surface of the one-way see-through illumination device by the light-reflecting image pattern that is registered to the illuminated image pattern on the front surface of the one-way see-through illumination device.

Further, the method of using an illumination blocking material, such as a printable clear varnish, to produce a one-way see-through illuminated image enables the mass production of standardized one-way see-through illumination film. This standardized one-way see-through illumination film, i.e., one-way see-through illumination film that does not present a specific graphic image, can then be produced at high speed using a rotary screen press, screen-cylinder press, or other high speed printing methods.

Figure 8:
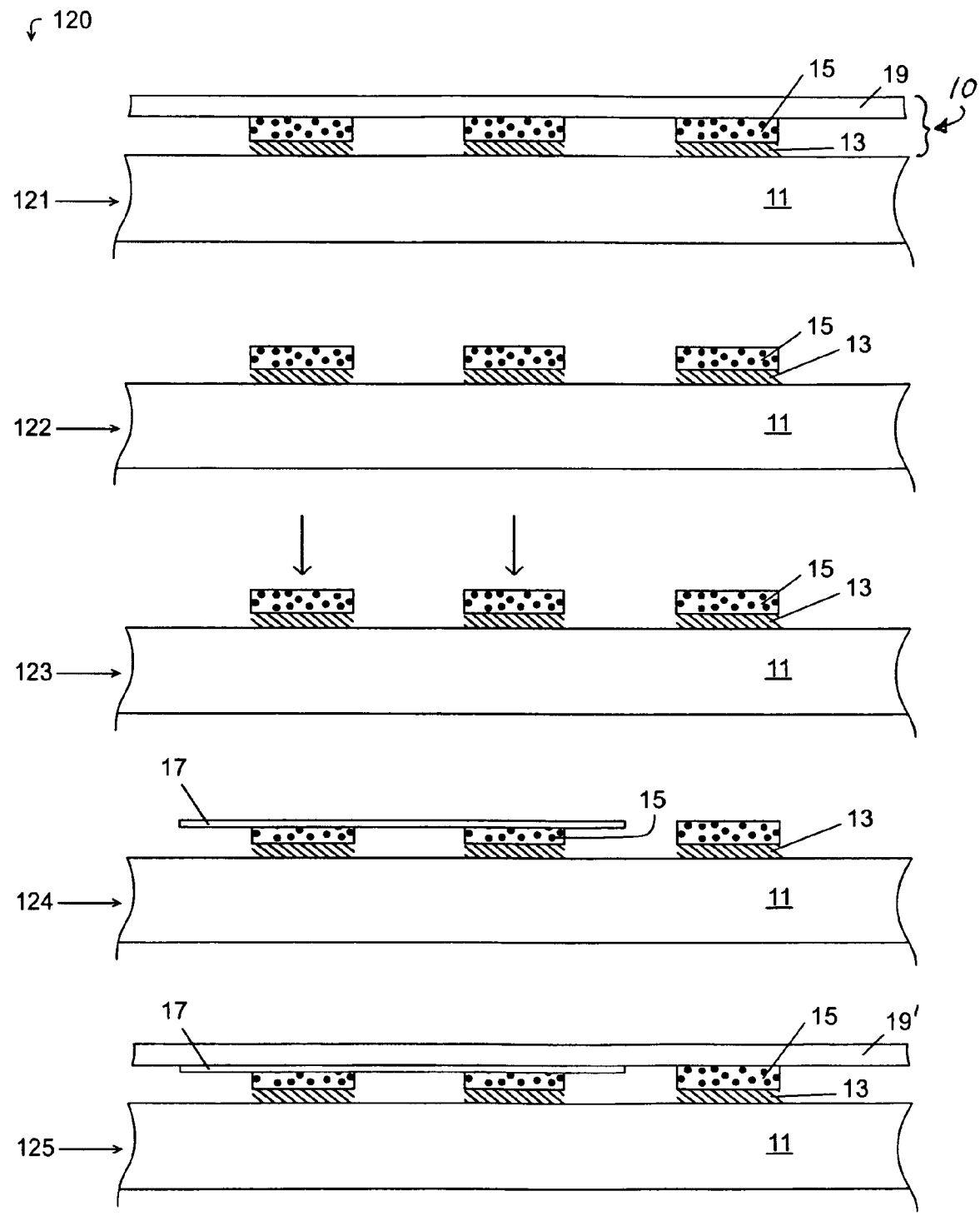
FIG. 8 is a process flow diagram of another particular method of manufacturing a one-way see-through image decal of FIG. 7.

FIG. 8 is a process flow diagram of another particular method of manufacturing the one-way see-through image decal of FIG. 7. The process 120 starts at step 121, where a pre-fabricated illuminable image decal 10 is prepared for processing. The decal 10 has a continuous illuminable image array covering the useable area of the decal 10. The decal 10 can be fabricated using any suitable manufacturing method, such as those described above with reference to FIGS. 5 and 6.

At step 122, the protective release material 19 is removed from the decal 10 so that the decal 10 can undergo additional processing into a specific pattern.

Once the pattern is defined, the unwanted portions of the pre-formed array (i.e., those portions of the pre-formed array that will not contribute to the specific pattern) must be optically decoupled from the light guide panel 30 (FIG. 7). One method is to physically remove the non-contributing portions of the array by die-cutting the structure. That approach may not be practical in all cases, so the non-contributing portions can be optically blocked from illumination.

Turning to step 123, the illuminable adhesive 15 over the desired or contributing portions of the array are left intact. The non-contributing portions of the array are further processed by mechanically ablating the illumination adhesive 15.

At step 124, the remaining illumination adhesive 15 over the non-contributing portions of the array is then covered by an illumination blocking layer 17. In particular, the blocking layer 17 can be optically clear film or a clear varnish that is printed as an image pattern. Because the material of the blocking layer is non-adhesive and does not adhere to the light guide panel 30, an air gap 18 can be maintained between the light guide panel and the blocking layer. The application of the "blocking" layer to the surface of a pixel thus prevents illumination by maintaining total internal reflection within the light guide panel 30 at those non-contributing pixel locations.

Lastly, at step 125, a protective release material 19' is deposited over the structure to protect the decal until use.

Figure 9:
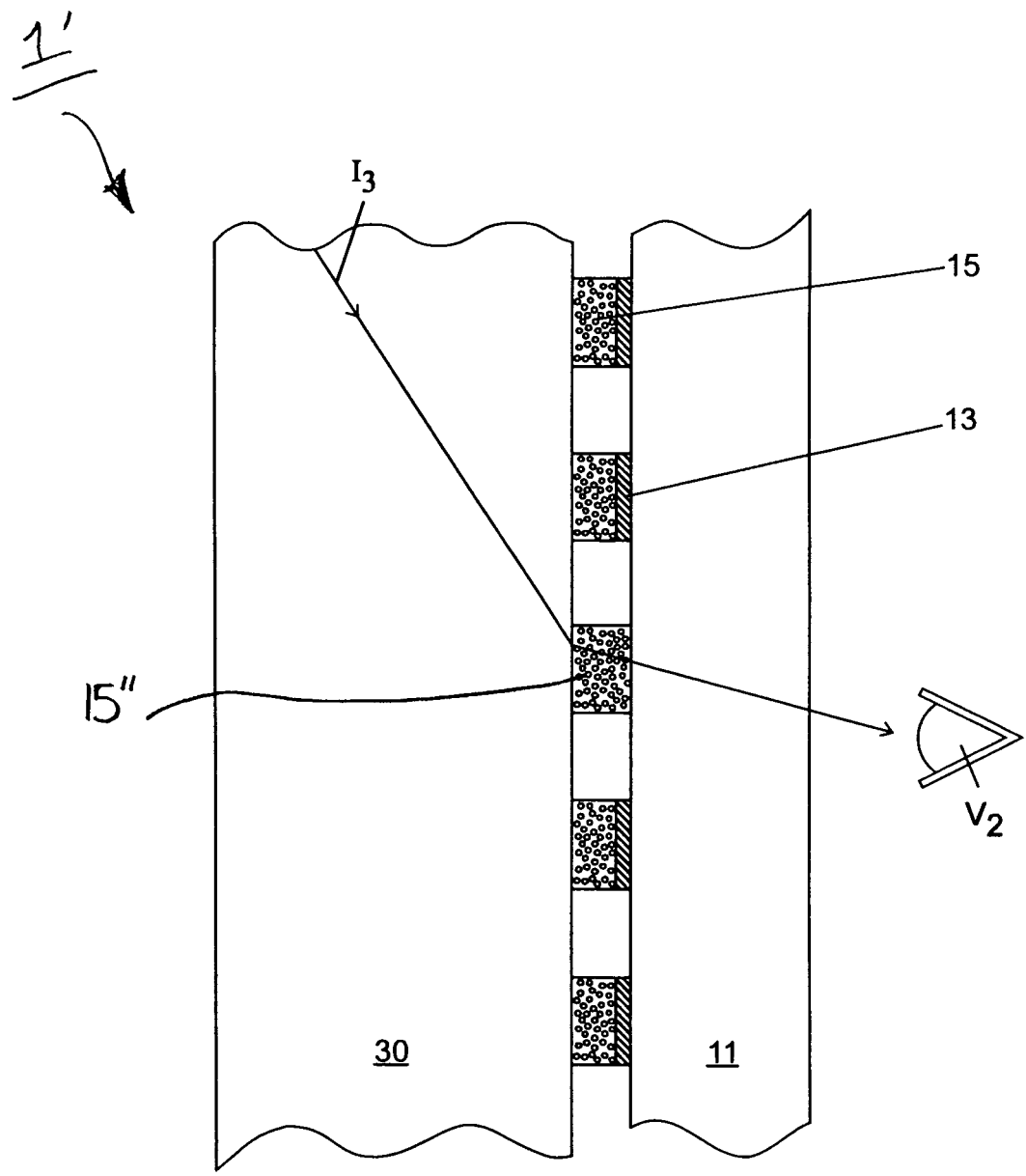
FIG. 9 is a foreshortened cross-sectional diagram of another embodiment of the one-way see-through device taken through line A-A of FIG. 1.

FIG. 9 is a foreshortened cross-sectional diagram of another embodiment of the device taken through line A-A of FIG. 1. In this embodiment, an area of illuminable adhesive 15" is not registered to a reflective pixel 13, thus enabling emission of injected light $I_3$ from the back side of the device for viewing by the back-side viewer $V_2$. That adhesive area 15" thus forms an indicator light that enables the back-side viewer $V_2$ to determine the power status of the one-way see-through illumination system 1' and the color of its active light source.

While the device has been described as having planar surfaces, the TIR effect can also occur with curved surfaces. As such, the invention can be embodied in curved structures having curved light guide panels, such as eyewear, novelty masks, etc.

Figure 10:
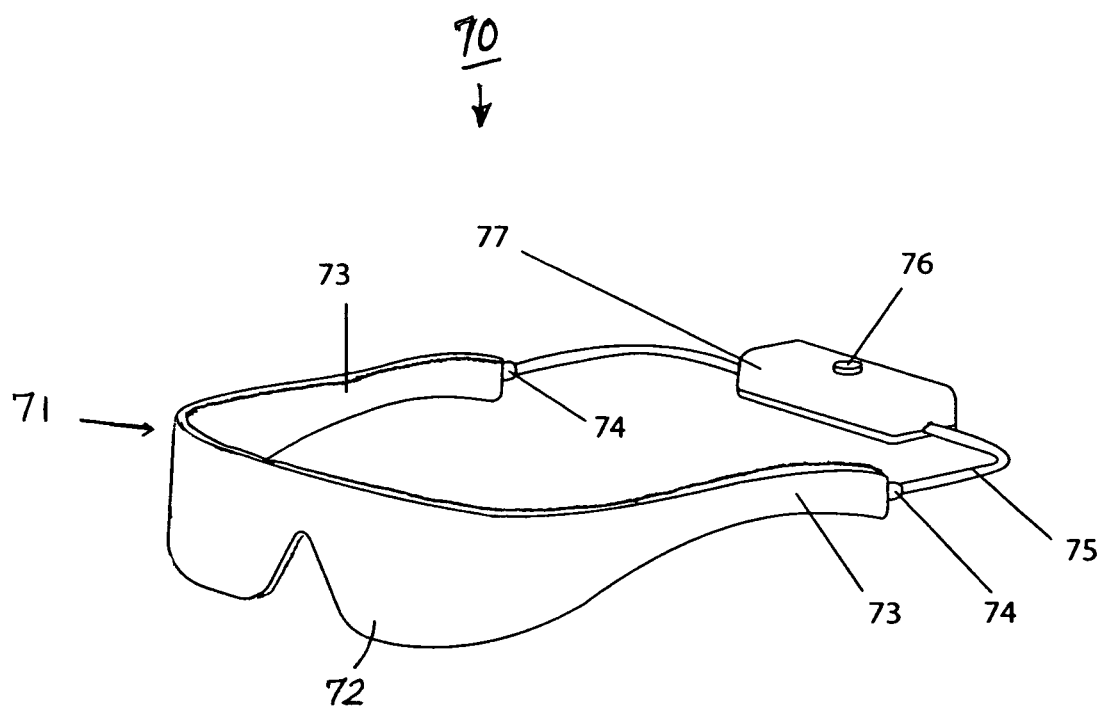
FIG. 10 is a front perspective view of a first set of novelty eyeglasses incorporating an embodiment of the invention.
Figure 11:
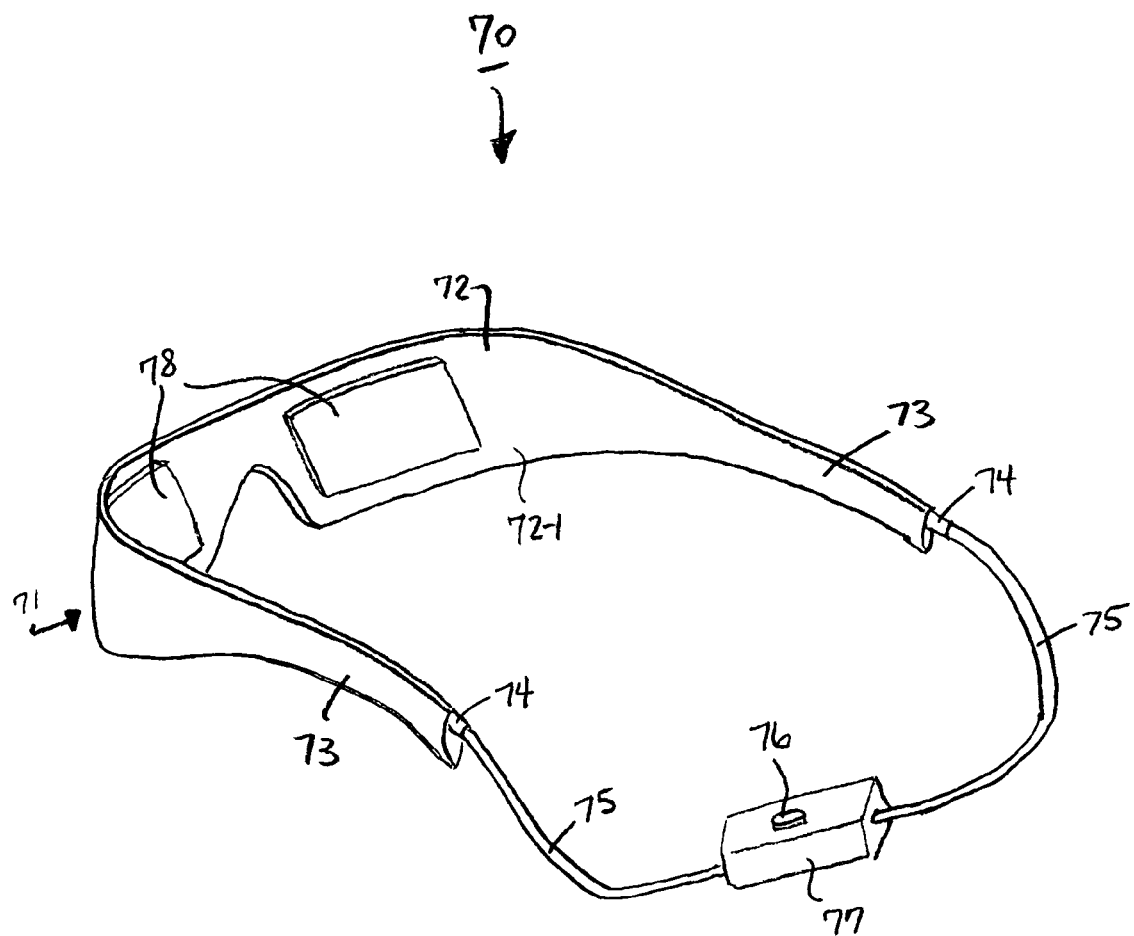
FIG. 11 is a rear perspective view of the novelty eyeglasses shown in FIG. 10.
Figure 12:
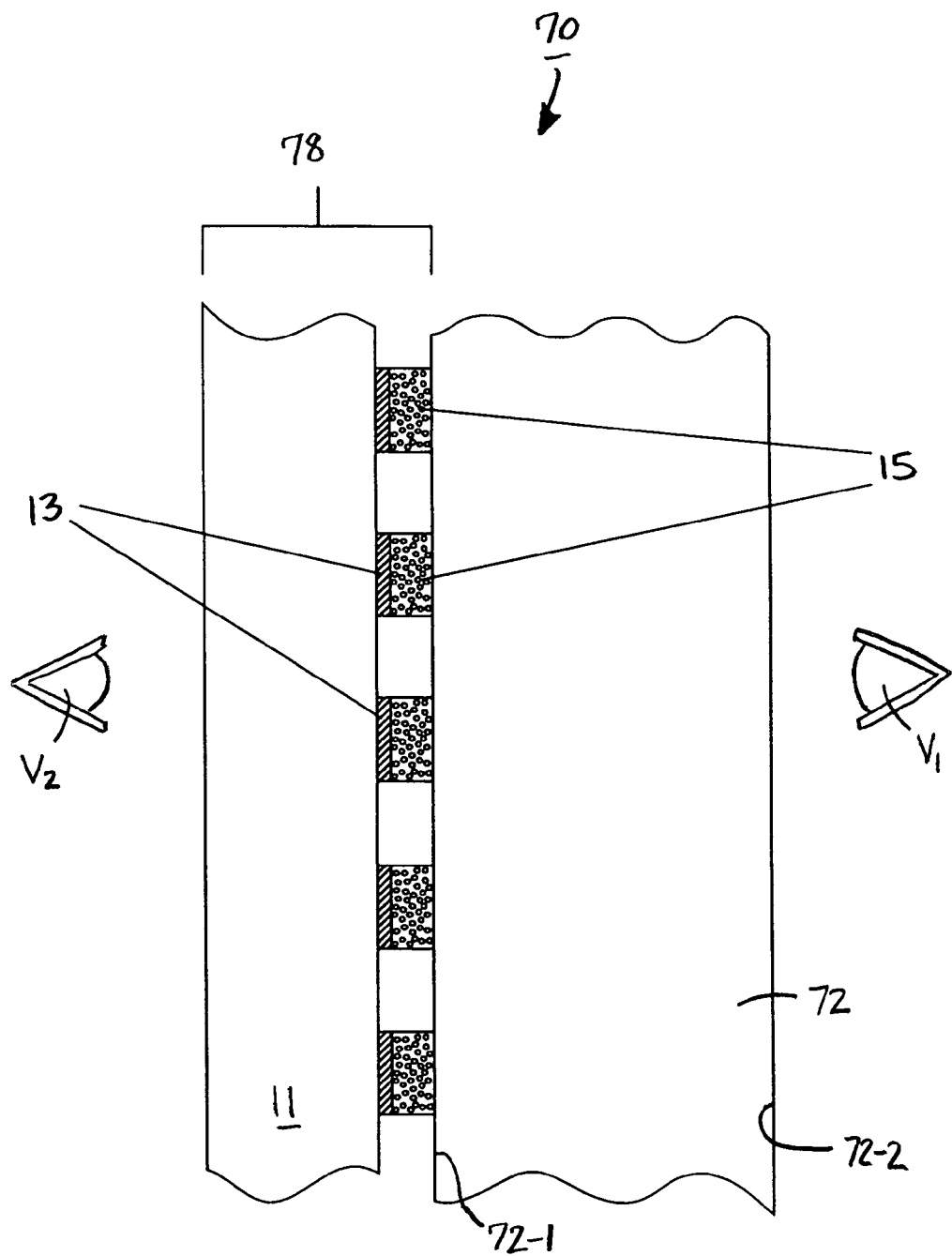
FIG. 12 is a fragmentary section view of the novelty eyeglasses shown in FIG. 10.

FIGS. 10 through 12 are front perspective, rear perspective, and fragmentary section views, respectively, of a first embodiment of personal headwear constructed according to the invention. In the particular embodiment shown, the headwear is a pair of novelty eyeglasses 70. Eyeglasses 70 comprise a head-mountable frame 71 that is made of a transparent material suitable for functioning as a light guide. Frame 71 is shaped to include a curved single lens 72 integrated with a pair of temple arms 73. Eyeglasses 70 also comprise a pair of image decals 78 applied to the inside surface 72-1 of lens 72. Each of image decals 78 may be similar in construction and function to one another and to image decal 10.

Eyeglasses 70 further comprise two sets of LEDs 74, preferably RGB LEDs, one set of LEDs 74 being optically coupled to each temple arm 73. Each set of LEDs 74 is arranged so as to inject light into its corresponding temple arm 73 at a suitable angle of incidence to promote total internal reflection of the injected light.

Eyeglasses 70 further comprise a power source, the power source comprising a battery pack 77 coupled to LEDs 74 by wires 75. Battery pack 77 may comprise one or more control switches 76 to control the brightness, timing, and color of the illumination from LEDs 74.

In use, eyeglasses 70 can be worn and operated by a wearer $V_2$ to display an image to an observer $V_1$.

While any of the above-described image patterns can be used in decals 78, in a particular embodiment, the image is a full half-toned image pattern. In other words, the usable area of the lens is filled with a pattern of pixels in an array. In this way, the wearer can generate continuously illuminated lenses or flash the lenses. The flashing of the lenses can be manually performed by the wearer or can be artificially generated by circuitry (not shown). In a particular embodiment, the lenses can flash in response to music, etc. from a digital music player. The two lenses can flash in sequence and in the same or different color, or the two lenses can flash independent of each other. Of course, the flashing would not be perceived by the wearer, only observers.

In this embodiment, as previously described, the decals 78 include a front surface with a high resolution image pattern of tiny illuminable image elements (pixels) backed by a reflective material. In a manner similar to mirrored sunglasses, wherein fifty percent of the lens is clear and fifty percent is coated with silver pixels too small to be perceived by a human eye, the novelty eyeglasses embodiment of this invention preferably employs a one-way see-through image decal with a twenty to fifty percent (20%-50%) halftone image rendered at a resolution greater than 100 lines per inch, with a 30% halftone image at 120 lines per inch being particularly suitable. This high resolution pattern of tiny pixels limits the perception of this pattern by the human eye. This means that individual image elements within the illuminable image pattern have a diameter of less than 3 mil (0.003 inches).

To produce a high resolution one-way see-through illumination decal, the production process should not excessively etch the light reflecting image pattern registered to the illuminable image pattern. If over-etching (commonly referred to as "etchback") occurs, then the illuminable image pattern is not backed by sufficient light reflecting material, resulting in illumination of a portion of the back surface of the one-way see-through illumination device. In the eyeglass embodiment of this invention, this is a particularly undesirable effect. Thus, it has been found that the high-speed etching of the light reflecting layer, i.e., the metal layer, of the one-way see-through illumination film, with a warm (150° F.) solution that is 50% water and 50% sodium hydroxide is the best method to produce the light-reflecting image pattern that is precisely registered to the illuminable image pattern on the front surface of the one-way see-through illumination device.

Referring now specifically to FIG. 12, one problem that the present inventor has observed in connection with eyeglasses 70 is that a small percentage of the injected light that is emitted from illuminable adhesive 15 and, thereafter, is directed towards the front surface 72-2 of lens 72 is reflected backwardly off front surface 72-2, where it may, thereafter, reach the eye of the eyeglass wearer $V_2$, as opposed to being transmitted through front surface 72-2. Although the amount of back-reflected light is small, i.e., approximately 4-7%, the presence of such back-reflected light is readily perceivable to the wearer when eyeglasses 70 are used under conditions of low-ambient light. Because eyeglasses 70 are intended to be worn under such conditions of low-ambient light, since this is when the light emitted from eyeglasses 70 will be most easily seen by observers, the aforementioned phenomenon of back-reflected light is highly undesirable.

Figure 13:
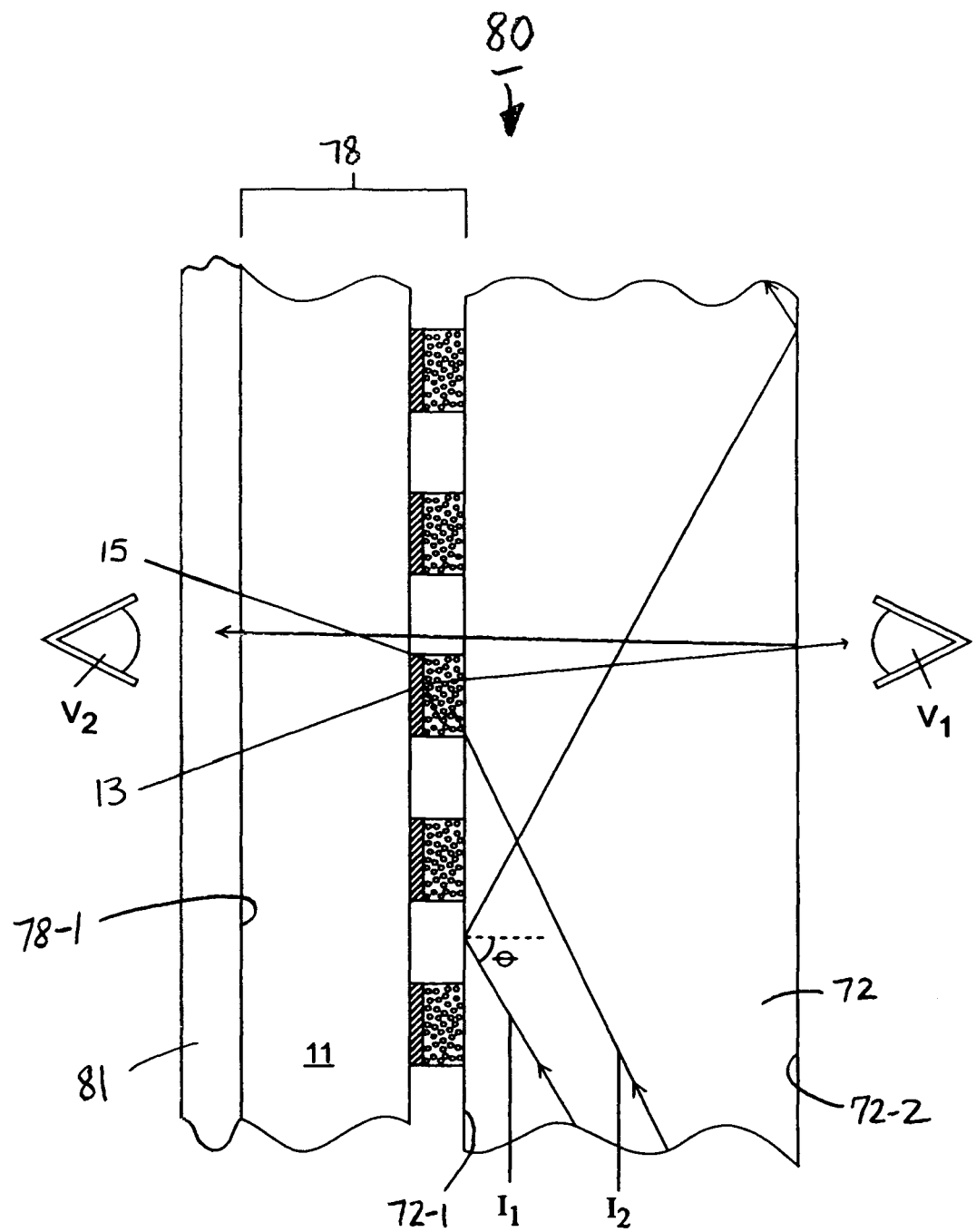
FIG. 13 is a fragmentary section view of a second set of novelty eyeglasses incorporating an embodiment of the invention.

Referring now to FIG. 13, there is shown a fragmentary section view of a second embodiment of personal headwear constructed according to the present invention, said personal headwear being designed to minimize the above-described phenomenon of back-reflected light that may be experienced, for example, in connection with eyeglasses 70. The personal headwear of the embodiment of FIG. 13 is in the form of a pair of novelty eyeglasses which are represented generally by reference numeral 80.

Eyeglasses 80 are similar in many respect to eyeglasses 70, the principal difference between the two pairs of eyeglasses being that eyeglasses 80 additionally comprise a color filter 81, which may be in the form of a film, positioned against the back surface 78-1 of decal 78. Filter 81 is selectively light-transmissive, blocking the transmission therethrough of the light emitted from illuminable adhesive 15 and reflected off front surface 72-2 of lens 72, but allowing the transmission therethrough of a broad range of other wavelengths of light. (The light emitted from illuminable adhesive 15 may be substantially monochromatic, either through the use of a substantially monochromatic injected light, which is then emitted by illuminable adhesive 15, and/or through the use of an illuminable adhesive 15 that emits substantially monochromatic light when illuminated with the injected light.) In other words, color filter 81 may be a complementary color filter of the back-reflected light previously emitted from illuminable adhesive 15, thereby absorbing the back-reflected light while letting other wavelengths of light pass therethrough. For example, if the back-reflected light previously emitted from illuminable adhesive 15 is green, color filter 81 may be red. If the light is orange, color filter 81 may be blue. If the light is yellow, color filter 81 may be violet. If the light is red, color filter 81 may be green. If the light is violet, color filter 81 may be yellow. If the light is blue, color filter 81 may be orange. In this manner, color filter 81 effectively eliminates back-reflected light from reaching the wearer $V_2$ but still permits the wearer $V_2$ to see most other wavelengths of light.

Figure 14:
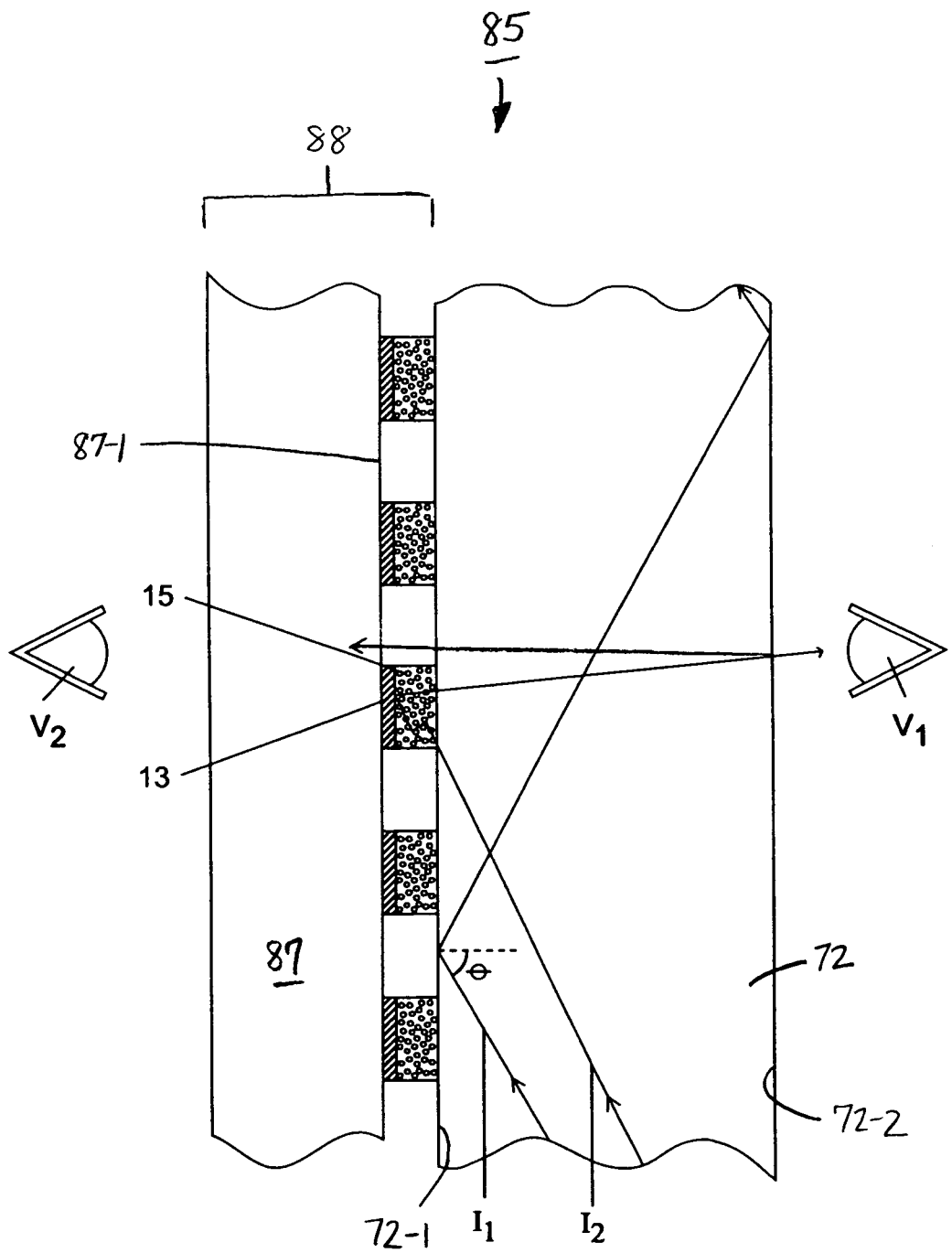
FIG. 14 is a fragmentary section view of a third set of novelty eyeglasses incorporating an embodiment of the invention.

Referring now to FIG. 14, there is shown a fragmentary section view of a third embodiment of personal headwear constructed according to the present invention, said personal headwear being in the form of a pair of novelty eyeglasses which are represented generally by reference numeral 85.

Eyeglasses 85, like eyeglasses 80, are designed to minimize the above-described phenomenon of back-reflected light that may be experienced, for example, in connection with eyeglasses 70. Eyeglasses 85 are similar in many respects to eyeglasses 80, the principal difference between the two pairs of eyeglasses being that, whereas eyeglasses 80 comprises the combination of backing layer 11 and color filter 81, eyeglasses 85 does not include backing layer 11 and, instead, comprises only a color filter 87, color filter 87 being similar to color filter 81. Reflective pixels 13 and illuminable adhesive 15 are arranged on the front surface 87-1 of color filter 87 so that filter 87, pixels 13 and adhesive 15 collectively form an image/filter assembly 88.

Figure 15:
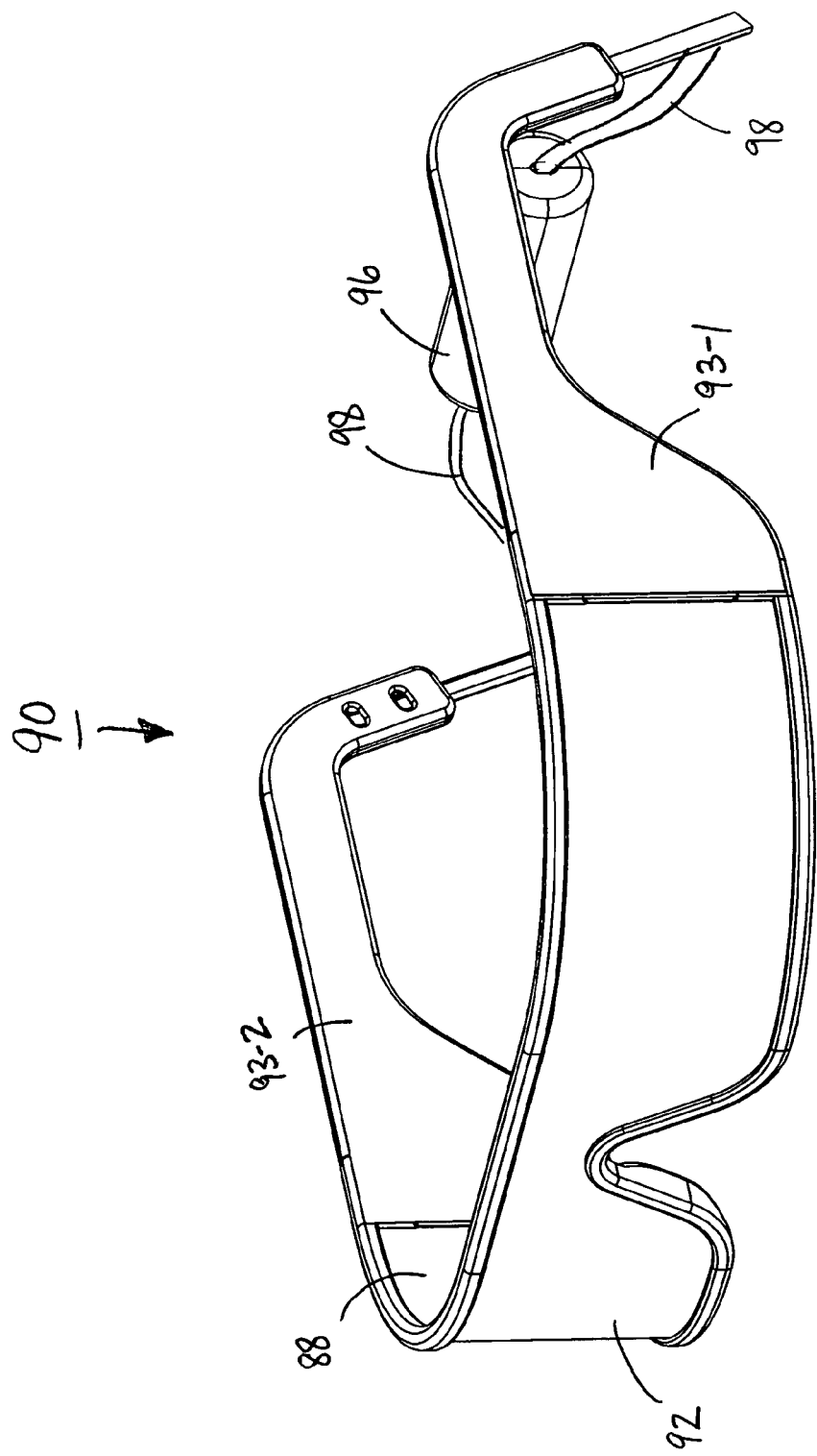
FIG. 15 is a front perspective view of a fourth set of novelty eyeglasses incorporating an embodiment of the invention.

Referring now to FIG. 15, there is shown a front perspective view of a fourth embodiment of personal headwear constructed according to the present invention, said personal headwear being in the form of a pair of novelty eyeglasses which are represented generally by reference numeral 90.

Figure 16:
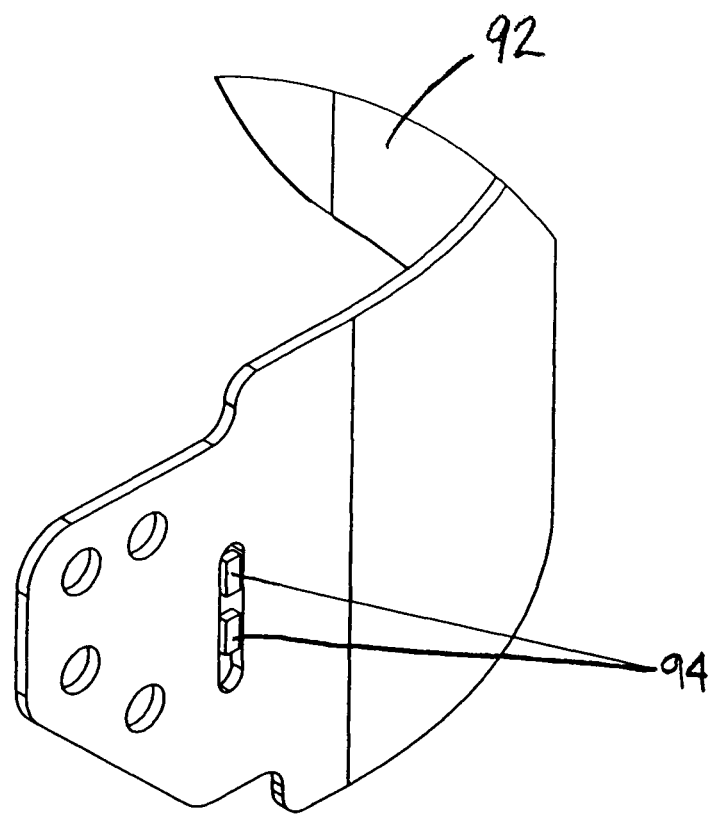
FIG. 16 is a fragmentary side perspective view of the light guide plate and the set of LEDs of the novelty eyeglasses of FIG. 15.

Eyeglasses 90, which are similar in many respects to eyeglasses 85, comprise a curved light guide plate 92 shaped to form a single lens. The ends of light guide plate 92 are adapted to be inserted into and coupled to a pair of temple arms 93-1 and 93-2. A set of LEDs 94 are mounted at one end of light guide plate 92 (see FIGS. 16 and 17) to inject light into light guide plate 92 at a suitable angle of incidence to promote total internal reflection of the injected light.

Figure 17:
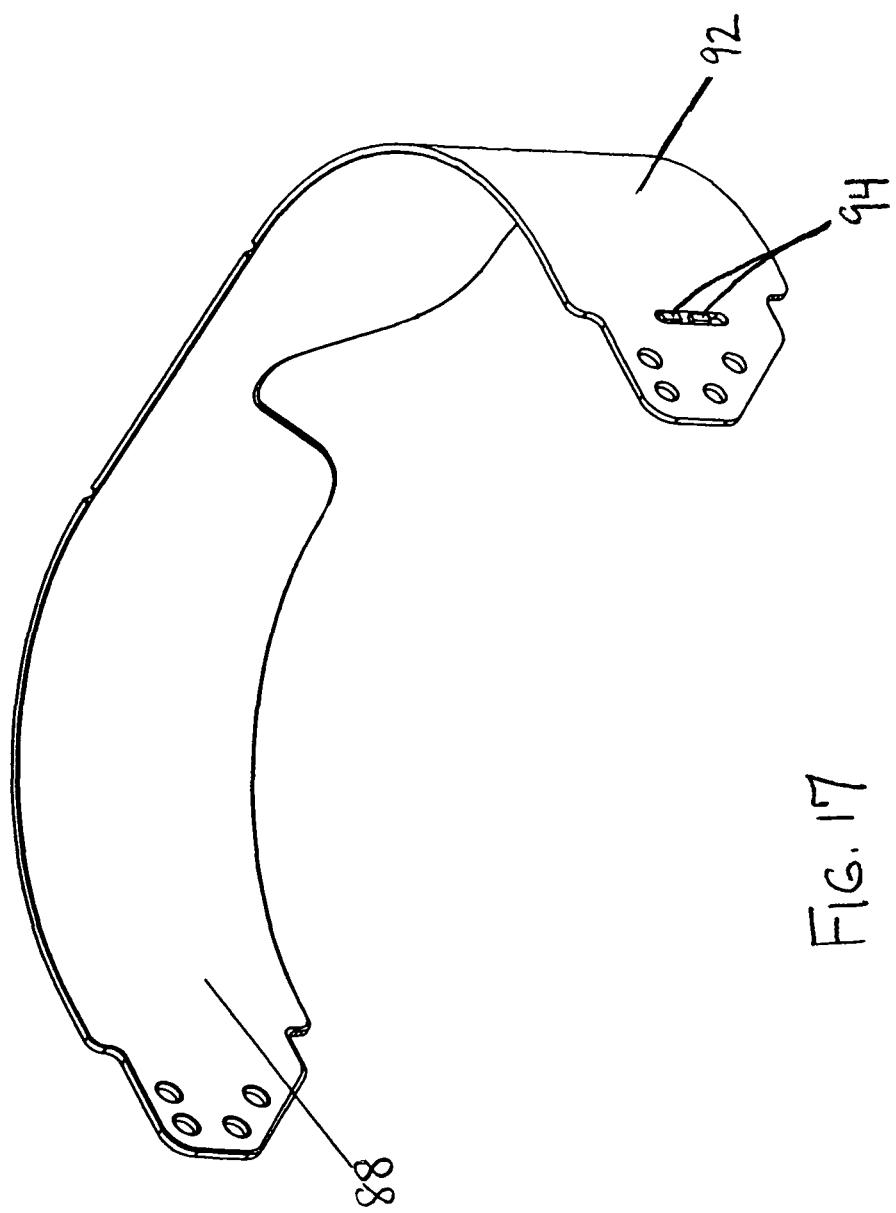
FIG. 17 is a rear perspective view of the combination of the light guide plate, the set of LEDs, and the image/filter assembly of the novelty eyeglasses of FIG. 15.
Figure 18:
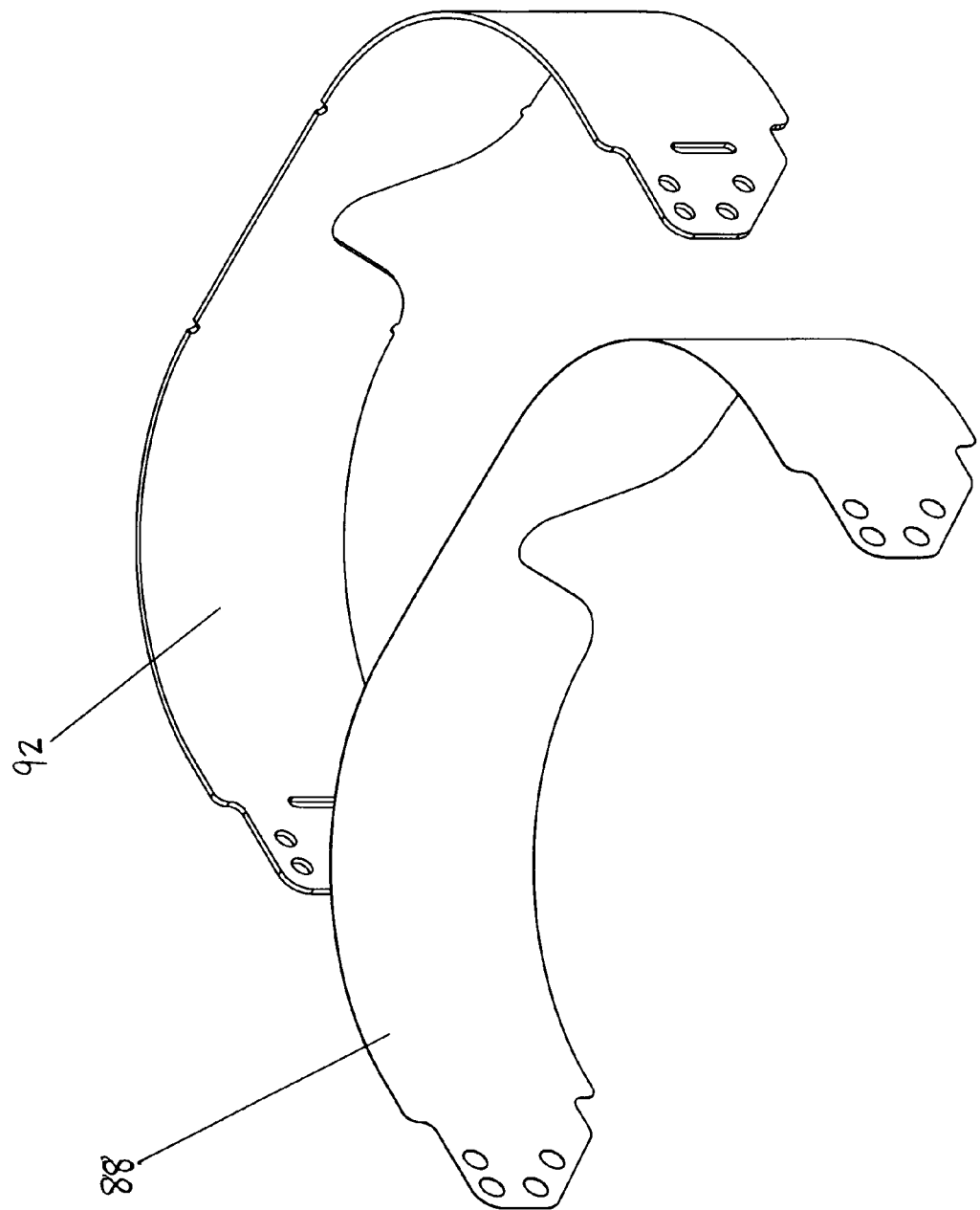
FIG. 18 is a partially exploded rear perspective view of the combination of the light guide plate and the image/filter assembly of the novelty eyeglasses of FIG. 15.

Eyeglasses 90 also comprise image/filter assembly 88 shaped correspondingly to light guide 92 and affixed to the inside surface of light guide 92 (see also FIGS. 17 and 18).

Eyeglasses 90 further comprise a power source, the power source comprising a battery pack 96 coupled to LEDs 94 by wires 98. Battery pack 96 may comprise one or more control switches (not shown) to control the brightness, timing, and color of the illumination from LEDs 94.

While the personal headwear has been described in reference to a pair of novelty eyeglasses, it should be understood that the technique can be applied to other types of personal headwear, such as face masks and helmets. Particular types of face masks include Halloween-type masks and party masks, where the body of the mask houses a one-way see-through light guide. Those of ordinary skill in the art will recognize additional applications for the one-way see-through illumination image film.

Although the use of battery power or a power adapter provides a ready power source for a one-way see-through illumination device, for many applications, a better power source may be solar-based. Many products exist that use a solar panel to charge batteries. The integration of a solar panel into the one-way see-through illumination system 1 (FIG. 1) can include a simple diode-based sensor to determine the onset of night to trigger illumination, as known in the art.

Figure 19:
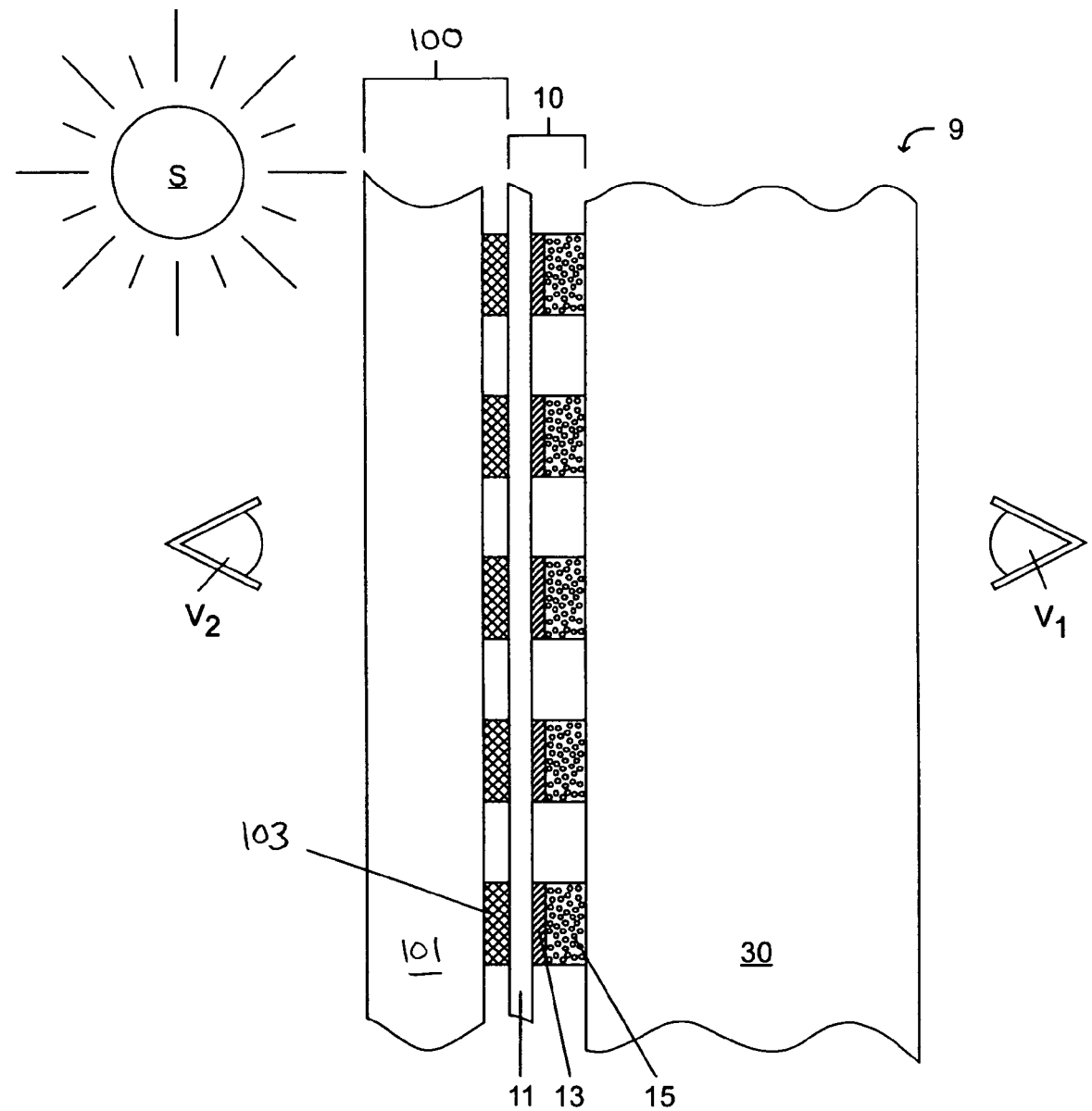
FIG. 19 is a foreshortened cross-section diagram of a solar powered one-way see-through illumination system in accordance with a particular embodiment of the invention.

FIG. 19 is a foreshortened cross-section diagram of a solar powered one-way see-through illumination system in accordance with a particular embodiment of the invention. In this embodiment, the illuminable image decal 10 is bonded to the outside of a window 30 to create the solar powered one-way see-through illumination system 9. In particular, an illuminable image decal 10 is dimensioned to cover the exterior surface of the window 30.

This embodiment employs a photovoltaic film 100 bonded to the exterior side of the illuminable image decal 10 as solar energy collector. The entire usable area of the illuminable image decal 10 comprises a half-toned image array. The photovoltaic film 100 includes a transparent backing layer 101 and a printed half-toned array of solar collectors 103. The solar cell array 103 is registered to reflective elements 13 in the half-tone image array in the one-way see-through film 10 to collectively produce a solar powered one-way see-through device 9. The photovoltaic film 100 is new technology and is available from multiple vendors including Konarka Technologies of Lowell, Mass., which sells this solar material under the name PowerPlastic.

A distinction of this embodiment over the previously-described embodiments is that it is used to provide interior versus exterior illumination. In such a device, the one-way see-through image film is applied to the exterior surface of the light guide, so the solar layer is exposed to sunlight S. This means the illuminable adhesive layer will provide interior lighting. In other words, a viewer on the outside of the decal $V_2$ sees a non-illuminated halftone pattern while the interior viewer $V_1$ sees an illuminated halftone pattern.

The above-described solar powered one-way see-through illumination device 9 can be deployed as a window or a window treatment that collects energy on its exterior surface during the day and then uses this energy to provide low-level interior lighting during the evening. This means low-level nighttime lighting could be provided to commercial buildings and other structures without the use of fossil fuels or other non-reusable energy sources.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A one-way see-through illumination device comprising:
   a light guide, the light guide having a front surface and a back surface, there being a predetermined critical angle of incidence at the front surface and the back surface sufficient to establish total internal reflection of light incident at the front surface and the back surface when interfaced with an expected ambient medium;
   a light source optically coupled to the light guide for injecting light into the light guide at an angle of incidence relative to the front surface and the back surface that is greater than the predetermined critical angle of incidence to promote total internal reflection of the injected light within the light guide;
   an image pattern comprising a back layer and a front layer, the back layer of the image pattern being a light reflecting material and the front layer of the image pattern being an illuminable material, wherein the illuminable material is bonded to the back surface of the light guide and extracts the injected light from the back surface of the sheet of optical material to illuminate the image pattern for viewing through the front surface of the light guide, wherein the light emitted from the illuminable material is substantially monochromatic; and
   a color filter positioned behind the illuminable material for selectively absorbing the substantially monochromatic light emitted from the illuminable material that is back-reflected off the front surface of the light guide, the color filter allowing other wavelengths of light to be transmitted therethrough.

2. The one-way see-through illumination device as claimed in claim 1 wherein the light guide is an eyeglass lens.

3. The one-way see-through illumination device as claimed in claim 1 wherein the color filter is positioned behind the back layer of the image pattern.

4. The one-way see-through illumination device as claimed in claim 1 wherein the image pattern comprises a plurality of pixels arranged in a half-tone image pattern.

5. The one-way see-through illumination device as claimed in claim 1 wherein the light reflecting material comprises aluminum.

6. The one-way see-through illumination device as claimed in claim 1 wherein the illuminable material comprises titanium dioxide.

7. The one-way see-through illumination device as claimed in claim 1 wherein the color filter is a complementary color filter.

8. The one-way see-through illumination device as claimed in claim 7 wherein the substantially monochromatic light is green and the complementary color filter is red.

9. The one-way see-through illumination device as claimed in claim 7 wherein the substantially monochromatic light is orange and the complementary color filter is blue.

10. The one-way see-through illumination device as claimed in claim 7 wherein the substantially monochromatic light is yellow and the complementary color filter is violet.

11. The one-way see-through illumination device as claimed in claim 7 wherein the substantially monochromatic light is red and the complementary color filter is green.

12. The one-way see-through illumination device as claimed in claim 7 wherein the substantially monochromatic light is blue and the complementary color filter is orange.

13. The one-way see-through illumination device as claimed in claim 7 wherein the substantially monochromatic light is violet and the complementary color filter is yellow.

14. The one-way see-through illumination device as claimed in claim 1 wherein the color filter comprises a film.

\* \* \* \* \*